(12) United States Patent
Eatough

(10) Patent No.: US 8,533,332 B1
(45) Date of Patent: Sep. 10, 2013

(54) SYSTEMS AND METHODS FOR OBTAINING EXCLUSIVE ACCESS TO A COMPUTING RESOURCE

(75) Inventor: David A. Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 941 days.

(21) Appl. No.: 11/764,467

(22) Filed: Jun. 18, 2007

(51) Int. Cl.
*G06F 15/173* (2006.01)

(52) U.S. Cl.
USPC .......................................... 709/226; 709/227

(58) Field of Classification Search
USPC .................................................. 709/226, 227
See application file for complete search history.

(56) References Cited

U.S. PATENT DOCUMENTS

| | | | |
|---|---|---|---|
| 6,246,669 B1 * | 6/2001 | Chevalier et al. ............. | 370/238 |
| 6,928,051 B2 | 8/2005 | Butt et al. | |
| 7,047,299 B1 * | 5/2006 | Curtis ........................... | 709/225 |
| 7,193,974 B2 | 3/2007 | Eatough et al. | |
| 2003/0187931 A1 | 10/2003 | Olsen et al. | |
| 2005/0076145 A1 * | 4/2005 | Ben-Zvi et al. ............... | 709/245 |

OTHER PUBLICATIONS

Kent Ridge Digital Labs., Singapore, The IEEE P1520 standards initiative for programmable network interfaces, Oct. 1998, vol. 36, Issue:10, pp. 1-7.*
Polychronis Koutsakis, Medium Access Control and Traffic Policing for Multimedia Integrated Access in High Capacity Wireless Channels, Fall 2002, Technical University of Crete, pp. 22-30.*

* cited by examiner

*Primary Examiner* — Thomas Dailey
(74) *Attorney, Agent, or Firm* — Austin Rapp & Hardman

(57) ABSTRACT

A method for obtaining exclusive access to a computing resource utilizing a network is disclosed. A discovery request is sent by a sending node within a network segment to one or more recipient nodes within the network segment. The discovery request is configured to determine whether each recipient node is accessing a specified computing resource. One or more replies to their request or an absence of replies from the recipient nodes are analyzed to determine whether any of the recipient nodes are accessing the specified computing resource. If the replies or the absence of replies indicate that none of the recipient nodes are accessing the specified resource, exclusive access is obtained on usage of the specified computing resource by the sending node.

21 Claims, 15 Drawing Sheets

SYSTEMS AND METHODS FOR OBTAINING EXCLUSIVE ACCESS TO A COMPUTING RESOURCE

TECHNICAL FIELD

The present invention relates generally to computers and computer-related technology. More specifically, the present invention relates to systems and methods for obtaining exclusive access to a computing resource utilizing a network.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry, and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time. Further, when a business or individual is trying to decide whether to make a change to a computer system, the concern about down-time may outweigh the benefit of the installation or may influence the decision.

As corporate performance and end-user productivity have become increasingly dependent on computers, computer support personnel are continuously under pressure to accomplish more with existing or reduced staff head counts. They are also under pressure to perform tasks as efficiently as possible, which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
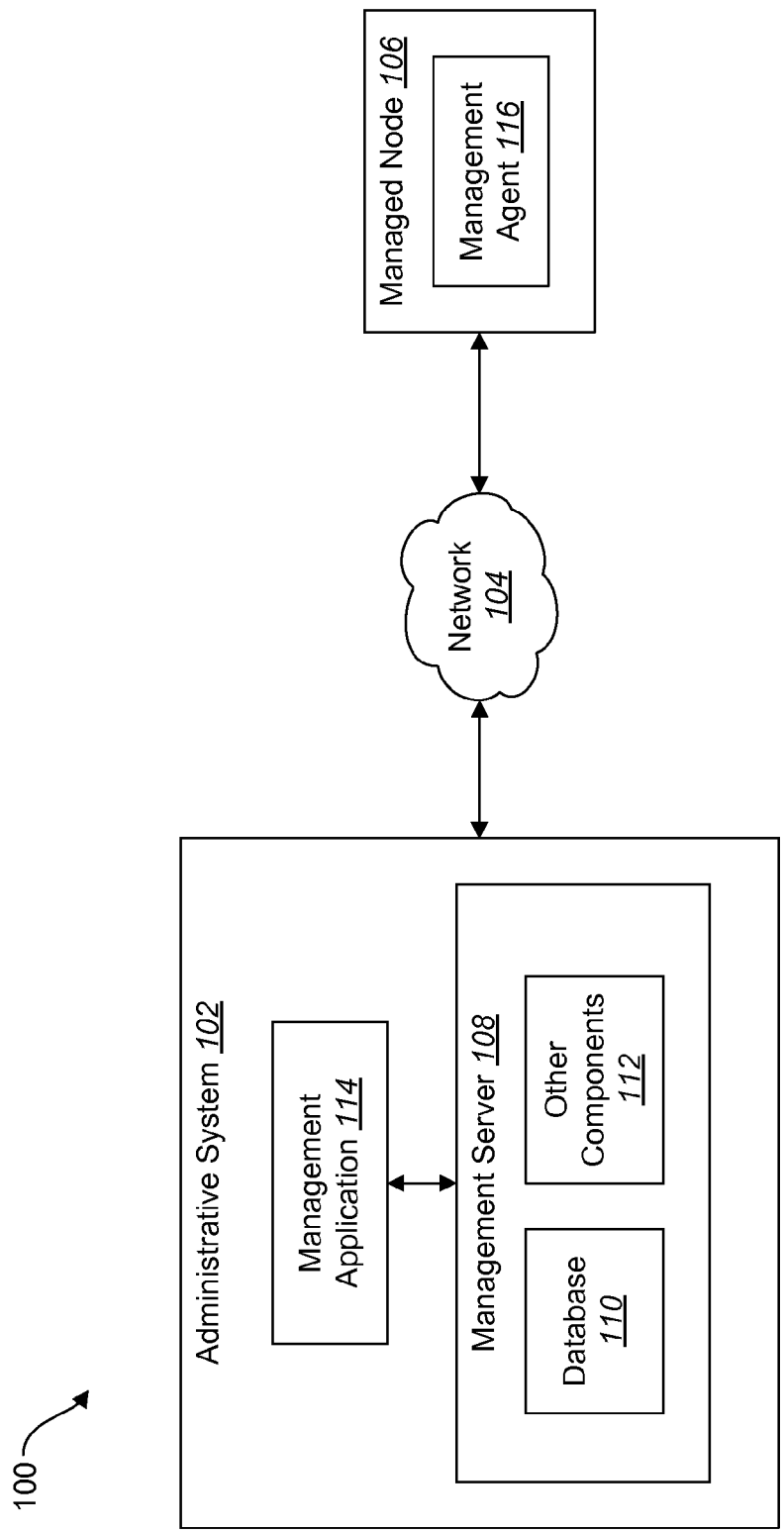
FIG. 1 is a block diagram that illustrates an exemplary system in which some embodiments may be practiced, the system including an administrative system and a managed node.

A method for obtaining exclusive access to one or more computing resources using a network is illustrated. In one embodiment, a discovery request is sent from a sending node within a network segment to one or more recipient nodes within the network segment. The discovery request is configured to determine whether each recipient node is accessing at least one specified computing resource. One or more replies or an absence of replies is analyzed in response to the discovery request to determine whether any one of the recipient nodes is accessing the specified computing resource(s). Exclusive access to the specified computing resource(s) by the sending node is obtained if the replies or the absence of replies indicate that none of the recipient nodes are accessing the specified resource(s).

One embodiment further comprises sending multiple discovery requests to each recipient node before obtaining exclusive access to the specified resource(s). The absence of a reply from a particular recipient node may indicate, in one implementation, that the particular recipient node is not accessing the specified resource(s).

In one embodiment, the method may further comprise accessing the specified computing resource(s). The network segment may comprise a subnet.

The discovery request may be configured to request a reply indicating if each recipient node is accessing at least one of two or more specified computing resources. Also, exclusive access to the specified computing resource(s) may be maintained by the sending node transmitting a reply or refraining from sending a reply in response to receipt of a request from another node within the network segment to indicate that the sending node has exclusive access to the specified resource(s). The discovery request may be sent, for example, using a point to multipoint protocol, a point to point connectionless protocol, or a point to point connection-based protocol.

A node on a network configured to execute instructions to implement the methods described above is also disclosed. The node includes a processor and memory in electronic communication with the processor. Instructions are stored in the memory to implement the methods described above. A computer-readable medium including executable instructions for obtaining exclusive access to a network resource is also disclosed.

Various embodiments of the invention are now described with reference to the Figures, wherein like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes" or "nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 includes a database 110 of information. The management server 108 also includes various other components 112 that are configured to perform tasks such as scheduling, handling alerts, and so forth. An example of a management server that may be used with embodiments disclosed herein is the core server for the LANDesk® Management Suite.

The administrative system 102 also includes a management application 114. The management application 114 may be used to perform various tasks related to the management of the computer network 104, such as remote control features, software distribution, software license monitoring, operating system imaging and migration, IT asset management, problem resolution, and so forth. As part of performing these tasks, the management application 114 may connect to the management server 108 and query the management server 108 to obtain information. An example of a management application 114 that may be used is the console application for the LANDesk® Management Suite. Although a management server 108 is shown in the embodiment depicted in FIG. 1, not all embodiments require a management server 108.

To enable a user of the administrative system 102 to perform management tasks via the management application 114, the managed node 106 includes a management agent 116. The management agent 116 performs management-related tasks in response to requests from the management application 114. An example of a management agent 116 that may be used is the LANDesk® Management Agent.

Figure 2:
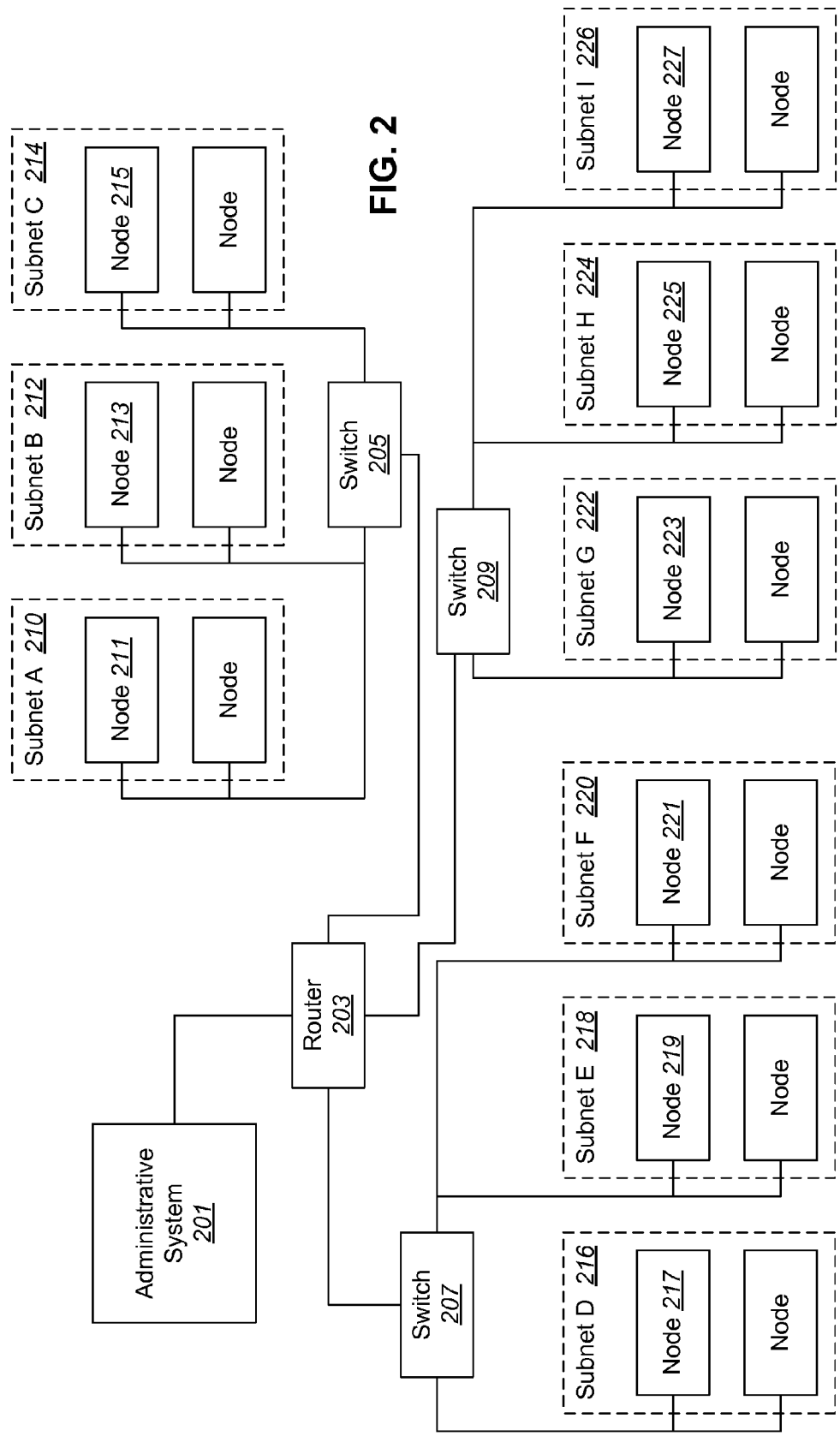
FIG. 2 is a block diagram depicting an embodiment of a computer network on which the present systems and methods may be implemented.

FIG. 2 illustrates a computer network on which the present systems and methods may be implemented. In FIG. 2, an administrative system 201 connects to a router 203. The router 203 is connected to three switches: a first switch 205, a second switch 207 and a third switch 209. Each switch 205, 207, 209 connects to three subnets. The first switch 205 connects to three subnets: subnet A 210, subnet B 212, and subnet C 214. The second switch 207 connects to three subnets: subnet D 216, subnet E 218, and subnet F 220. The third switch 209 connects to three subnets: subnet G 222, subnet H 224, and subnet I 226. Each subnet includes one or more managed nodes. The managed nodes 211, 213, 215, 217, 219, 221, 223, 225 and 227 represent computer systems or devices on the computer network.

Figure 3:
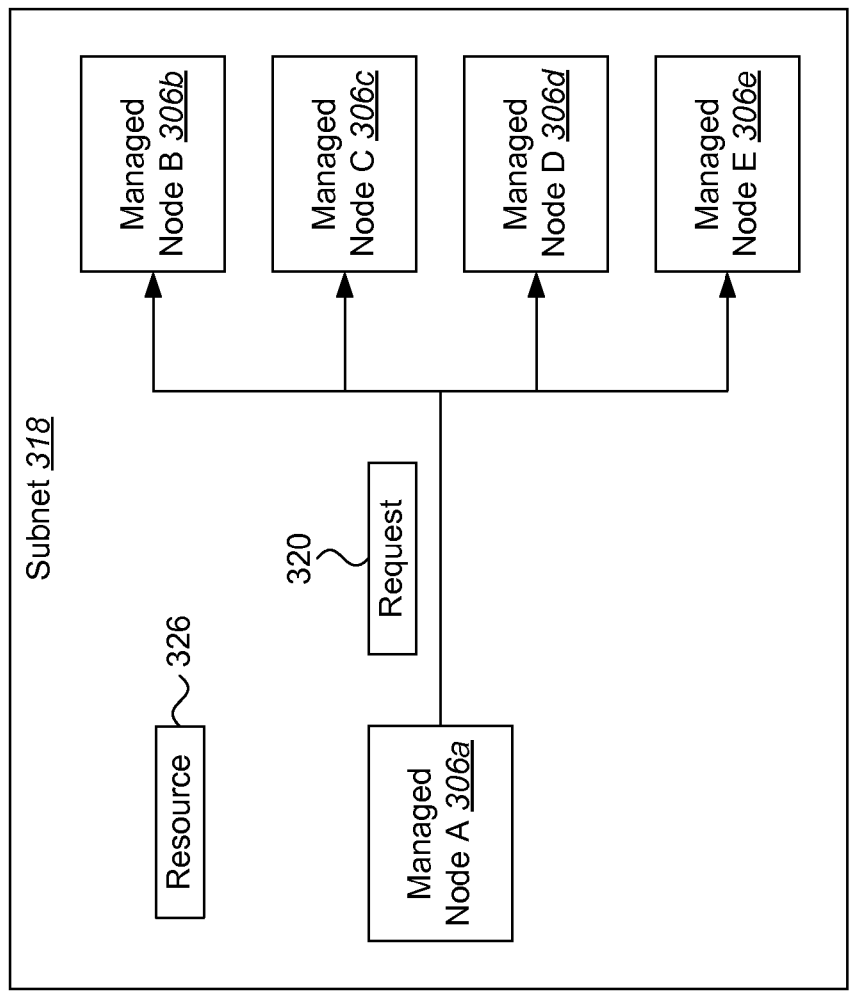
FIG. 3 is a block diagram showing one embodiment of a system for transmitting a discovery request to recipient nodes.

FIG. 3 illustrates the operation of the managed nodes 306 in a network segment, such as a subnet 318, according to an embodiment. In the illustrated embodiment, the subnet 318 includes five managed nodes: managed node A 306a, managed node B 306b, managed node C 306c, managed node D 306d, and managed node E 306e.

At some point, managed node A 306a attempts to obtain exclusive access to a computing resource 326. A "computing resource" or "resource" refers to software or data that may be used by a computer program or a computing device or peripheral. Some examples of resources 326 include a file, an executable program, dynamic web content such as a response from a CGI (Common Gateway Interface) or ISAPI (Internet Server Application Program Interface) application, a printer, a scanner, a server, etc. In order to obtain exclusive access to the desired resource 326, managed node A 306a, which may also be referred to as the "sending node," sends a discovery request 320 to the other managed nodes 306b-e in the local subnet 318, i.e., managed node B 306b, managed node C 306c, managed node D 306d, and managed node E 306e. Nodes that receive the discovery requests 320 may be referred to as "recipient nodes." The resource 326 may be internal to the subnet 318, as illustrated in FIG. 3. Alternatively, the resource 326 could be external to the subnet 318 or even the network 104 (shown in FIG. 1).

Figure 4:
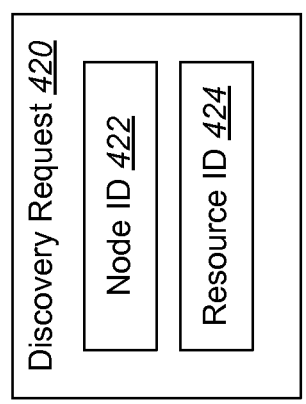
FIG. 4 is a block diagram that depicts an exemplary discovery request that may be sent to recipient nodes within a network segment.

FIG. 4 illustrates an exemplary discovery request 420 that may be used. Discovery request 420 is configured to determine whether each recipient node 306 is accessing a specified computing resource 326. The discovery request 420 includes a node identifier 422. The node identifier 422 identifies the managed node 306 that is sending the discovery request 420, e.g., the sending node 306a shown in FIG. 3.

The discovery request 420 also includes a resource identifier 424. The resource identifier 424 identifies a resource that the sending node 306a is seeking to obtain exclusive access to. Some examples of resource identifiers 424 that may be used include a file name, a file path, a file size, a file date (e.g., the date on which the file was last updated), a Cyclic Redundancy Checking (CRC) value, a hash value, a Uniform Resource Locator (URL) address, a Universal Naming Convention (UNC) path, Internet Protocol (IP) address, an identifier from a database for a separate list of files, etc. The request 420 may include identifiers for one or more resources. In the example shown in FIG. 4, the discovery request 420 is for a single resource. In an alternate embodiment, the request 420 could include multiple resource identifiers 424. For example, the discovery request 420 may include requests for resource A, resource B, and resource C. A discovery request 420 may be formulated in various ways beyond the exemplary embodiments discussed above.

Figure 5:
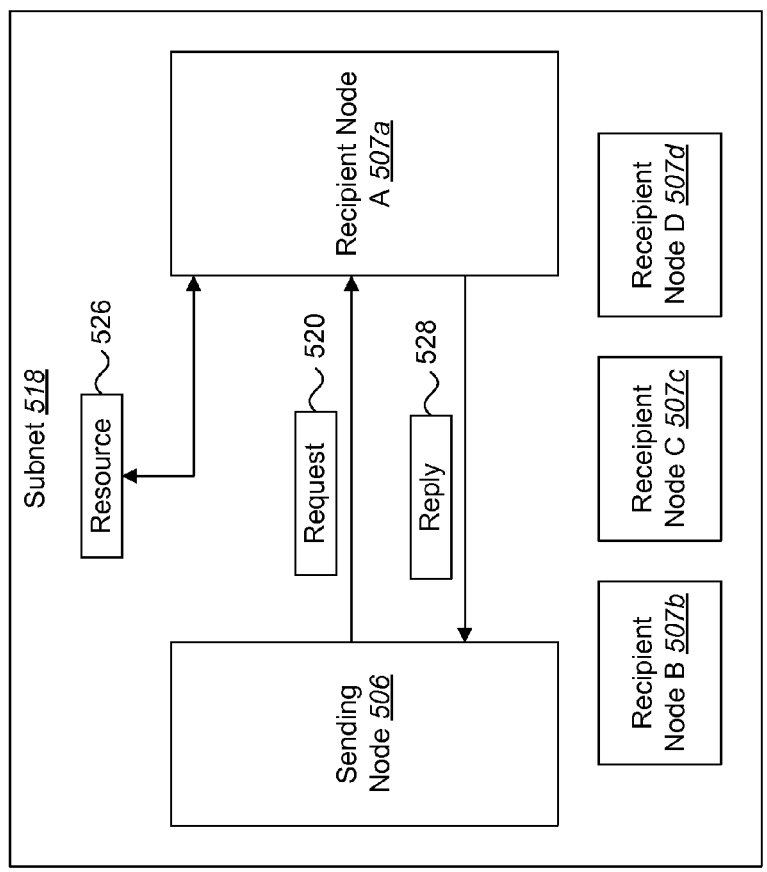
FIG. 5 is a block diagram illustrating one embodiment of a system for obtaining exclusive access to a computing resource wherein exclusive access is not obtained.

FIG. 5 illustrates an example showing how the recipient nodes 507 in the subnet 518 may respond to a discovery request 520 sent from sending node 506. In the illustrated example, recipient node A 507a is accessing the desired resource 526. Recipient node B 507b, recipient node C 507c, and recipient node D 507d are not accessing the desired resource 526.

In response to receiving the discovery request 520, recipient node A 507a sends a reply 528 to the sending node 506. The reply 528 indicates that recipient node A 507a is accessing the resource. Recipient node B 507b, recipient node C 507c, and recipient node D 507d do not reply to the discovery request 520, indicating that these nodes 507b, 507c, 507d are not accessing the resource 526. Because of the reply 528, the sending node 506 does not obtain exclusive access to the resource 526.

In the embodiment illustrated in FIG. 5, a recipient node 507 replies only if it is accessing the specified resource 526. This embodiment is merely exemplary. In another embodiment, each recipient node 507b, 507c, 507d that is not accessing the resource transmits a reply 528. In yet another embodiment, each recipient node 507a, 507b, 507c, 507d transmits a reply 528. Data within the reply 528 indicates whether any of the recipient nodes 507a, 507b, 507c, 507d are accessing the resource 526.

The discovery request 520 may be sent in a number of different ways. Exemplary types of protocols that may be used in transmitting the request 520 are illustrated in FIGS. 5A-C and discussed below.

Figure 5A:
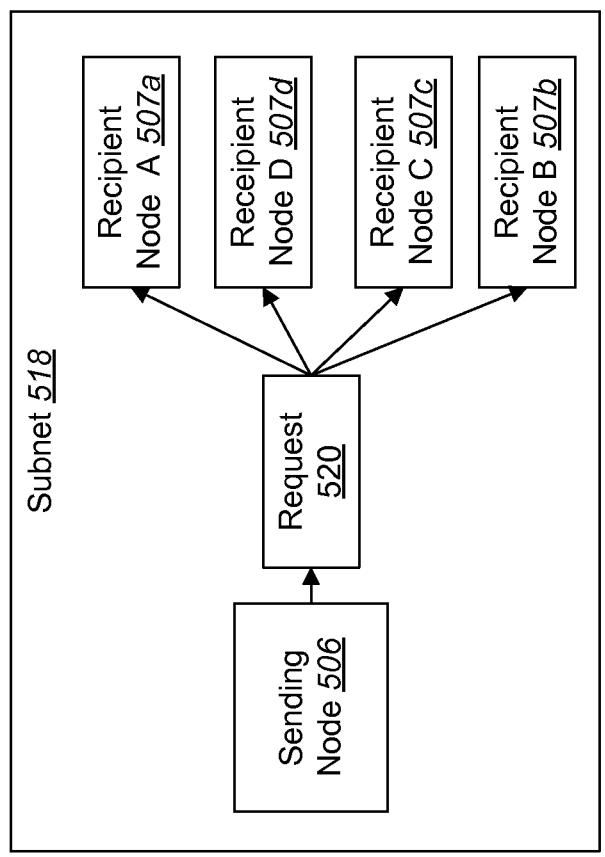
FIGS. 5A-C illustrate various protocols for transmitting discovery requests.

One such protocol is a point to multipoint protocol, an example of which is shown in FIG. 5A. In the illustrated embodiment of a point to multipoint protocol, the requesting node 506 sends a network packet, or a request 520, to all of the nodes 507a-d on the subnet 518 at the same time. Specific examples (by way of illustration, not limitation) of this would include a UDP/IP multicast or broadcast protocol. Using this protocol, only one packet, or request 520, needs to be sent on the network.

Figure 5B:
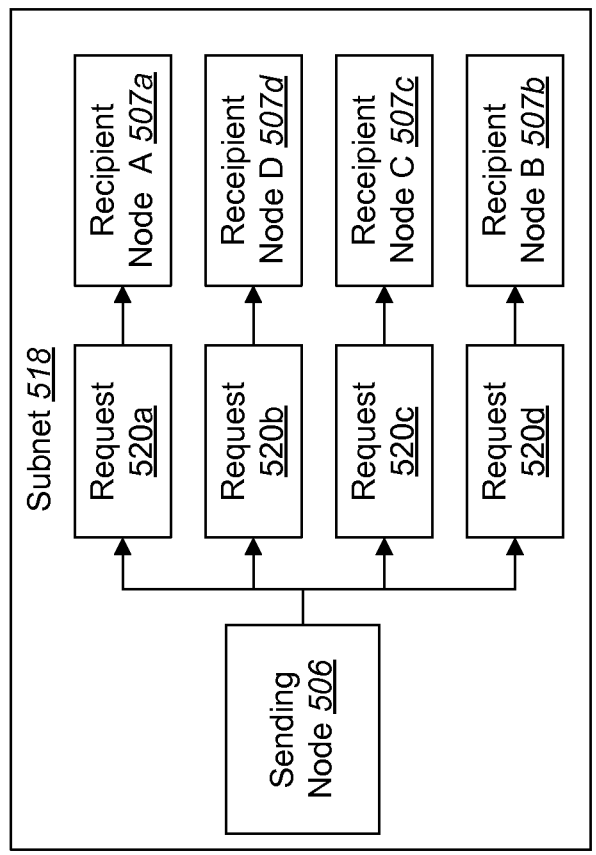

Another type of protocol is the point to point connectionless protocol, an embodiment of which is illustrated in FIG. 5B. In the illustrated embodiment of this protocol, the requesting node 506 sends out one packet, or request 520, to each of the receiving nodes 507a-b. Here, multiple packets, or requests 520, are sent out.

Figure 5C:
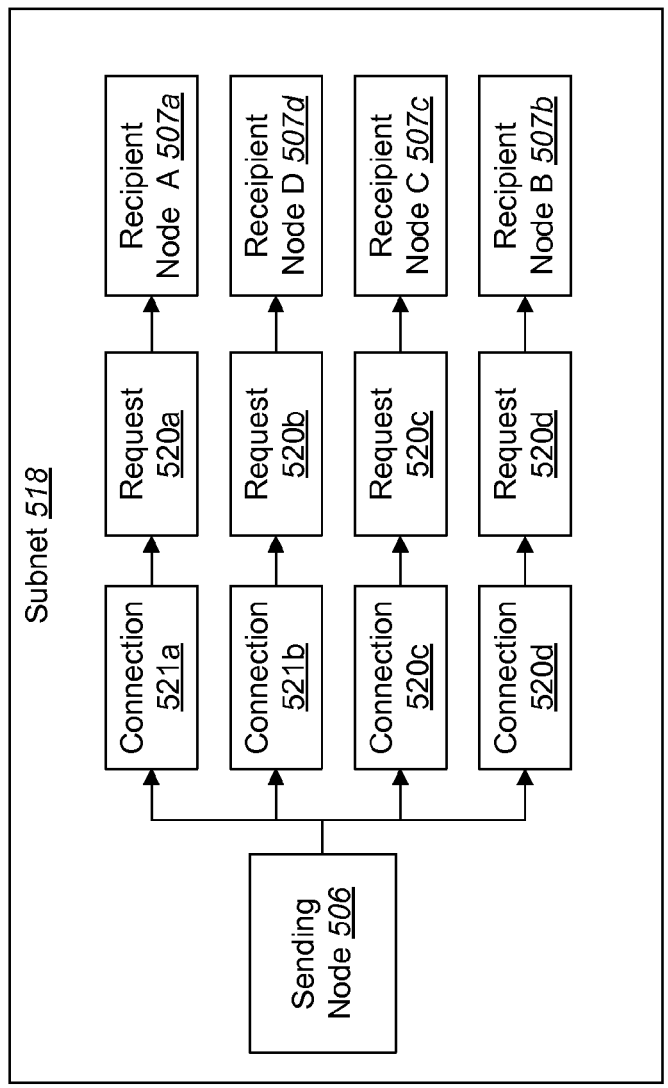

Yet another type of protocol is a point to point connection-based protocol, an example of which is illustrated in FIG. 5C. In the illustrated embodiment of this protocol, the requesting node 506 establishes a connection 521, sends a request 520, and may receive a reply 528 (shown in FIG. 5) from each node 507a-d one at a time. A connection 521 is established with each node 506b-e, and, in certain embodiments, a connection timeout period may be set for nodes 5078-d that are not available. An example of this type of protocol is the TCP protocol.

Figure 6:
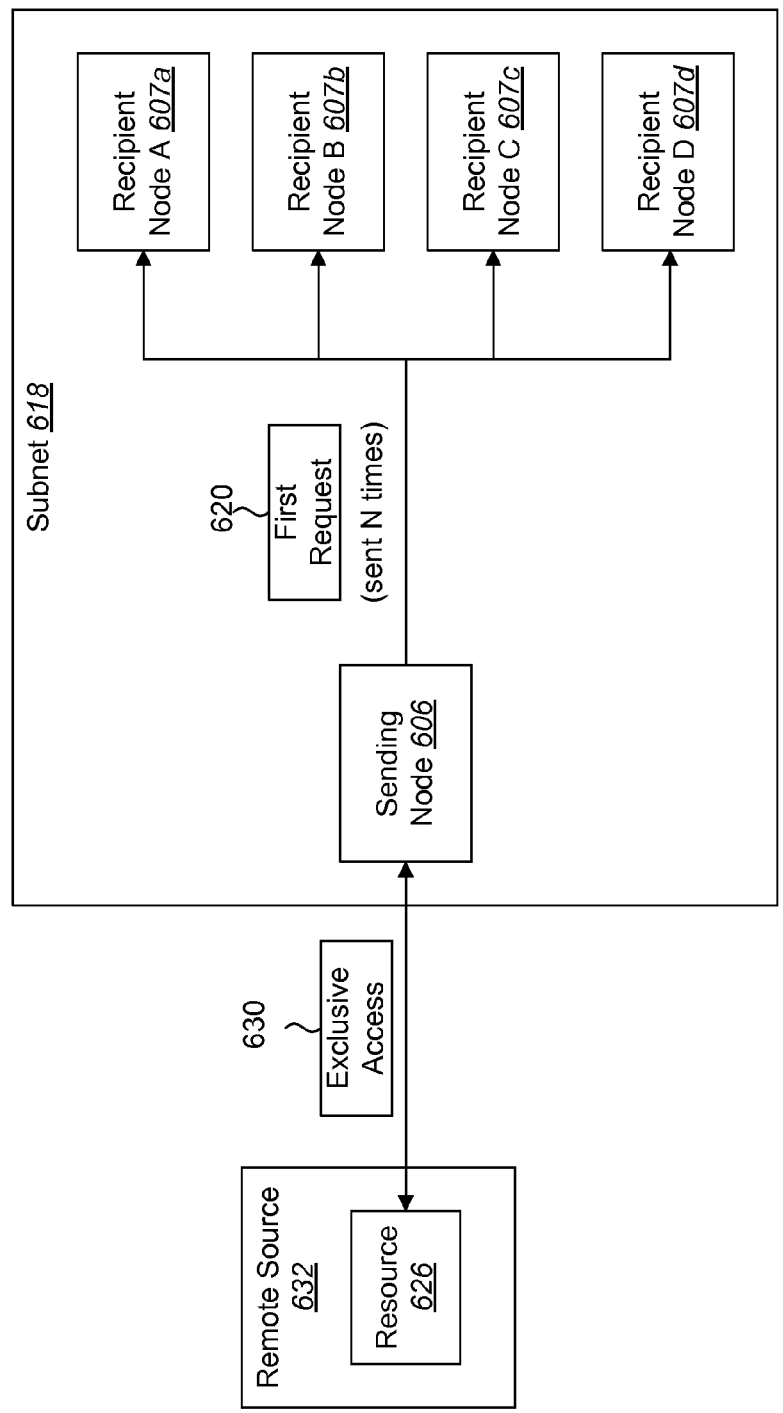
FIG. 6 is a block diagram that shows an exemplary system for obtaining exclusive access to a computing resource wherein exclusive access is obtained.

FIG. 6 provides another example of how recipient nodes 607 in the subnet 618 may respond to a discovery request 620 sent from a sending node 606. In the illustrated example, none of the recipient nodes 607 in the subnet 618 (i.e., recipient node A 607a, recipient node B 607b, recipient node C 607c, and recipient node D 607d) are accessing the specified resource 626. Consequently, none of the recipient nodes 607 in the subnet 618 reply to the discovery request 620 sent by sending node 606.

After waiting for a certain period of time without receiving a response, the sending node 606 resends the discovery request 620. The sending node 606 continues to do this until it has sent the discovery request 620 N times without receiving a reply (where N may be any positive integer). The value of N may be specified in a configuration file or the like. Once the discovery request 620 has been sent N times without receiving a reply, the sending node 606 obtains exclusive access 630 to the resource 626.

Using the exclusive access 630, the sending node 606 may accurately test bandwidth between a remote source 632 and the sending node 606, without interference from other nodes 607 within the subnet 618. As another example, the sending node 606 could obtain exclusive access 630 to a printer, one type of resource 626, before a large or important print job is transmitted to the printer.

As illustrated in FIG. 6, the resource 626 is situated within, or comprises a portion of, a remote source 632. The remote source 632 may be, for example, any computer system that is located somewhere outside of the local network segment (i.e., the subnet 618 in the illustrated embodiment).

Figure 7:
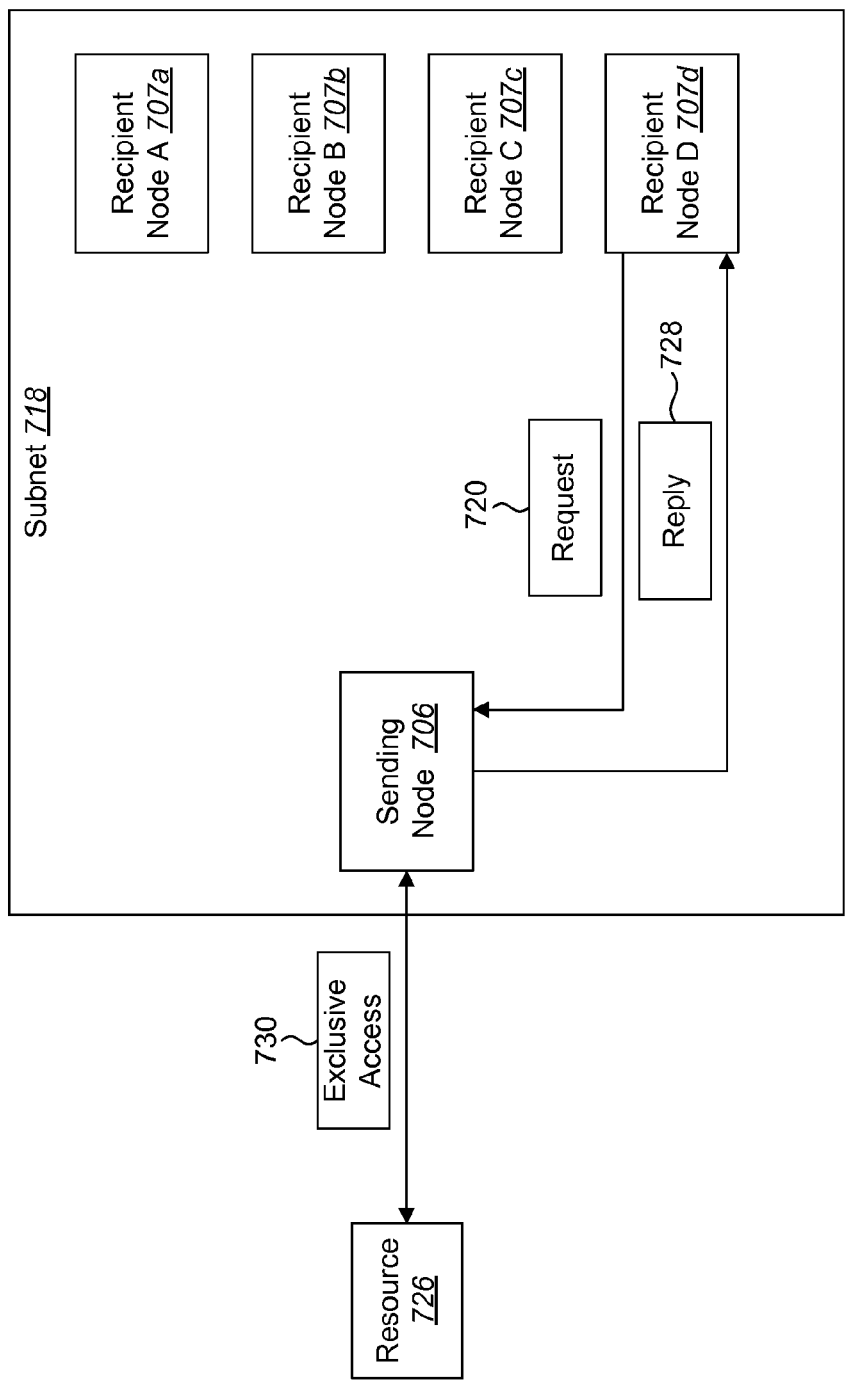
FIG. 7 is a block diagram that illustrates one embodiment of a system for maintaining exclusive access to a resource where a discovery request is received from a recipient node.

FIG. 7 illustrates one method by which exclusive access 730 may be maintained. In FIG. 7, the sending node 706 has exclusive access 730 on a resource 726. A recipient node D 707d transmits a discovery request 720 to the sending node 706. In response to the request 720, the sending node 706 transmits a reply 728 to the recipient node D 707d, indicating that the sending node 706 is accessing the resource 726. Based on the reply 728, the recipient node D will not attempt to access or obtain exclusive control of the resource 726. Thus, the sending node 706 prevents other nodes 707a, 707b, 707c from interrupting the exclusive access 730 that the sending node 706 has on the resource 726. As indicated above, various techniques and systems may be used to indicate when a node 706, 707 is accessing a resource 726, such as sending a reply 728 when only a recipient node 707 is not accessing the resource 726.

Figure 8:
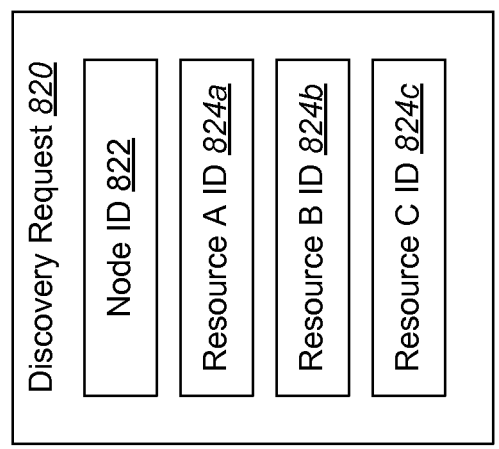
FIG. 8 is a block diagram showing an embodiment of a discovery request configured to obtain exclusive access to multiple resources.

FIG. 8 illustrates another exemplary discovery request 820 that may be sent by a sending node 706 to the recipient nodes 707 in the subnet 718. As before, the discovery request 820 includes a node identifier 822. The node identifier 822 identifies the recipient node 707 that is sending the discovery request 820.

The discovery request 820 also includes multiple resource identifiers 824. In particular, the discovery request 820 includes an identifier 824a for resource A, an identifier 824b for resource B, and an identifier 824c for resource C. Each resource identifier 824 identifies resources 726 that the sending node 706 is seeking to obtain exclusive access 730 to. Although the example in FIG. 8 shows three resource identifiers 824a-c, this is only done for the purpose of illustration. Any number of resource identifiers 824 may be included in the discovery request 820.

Figure 9:
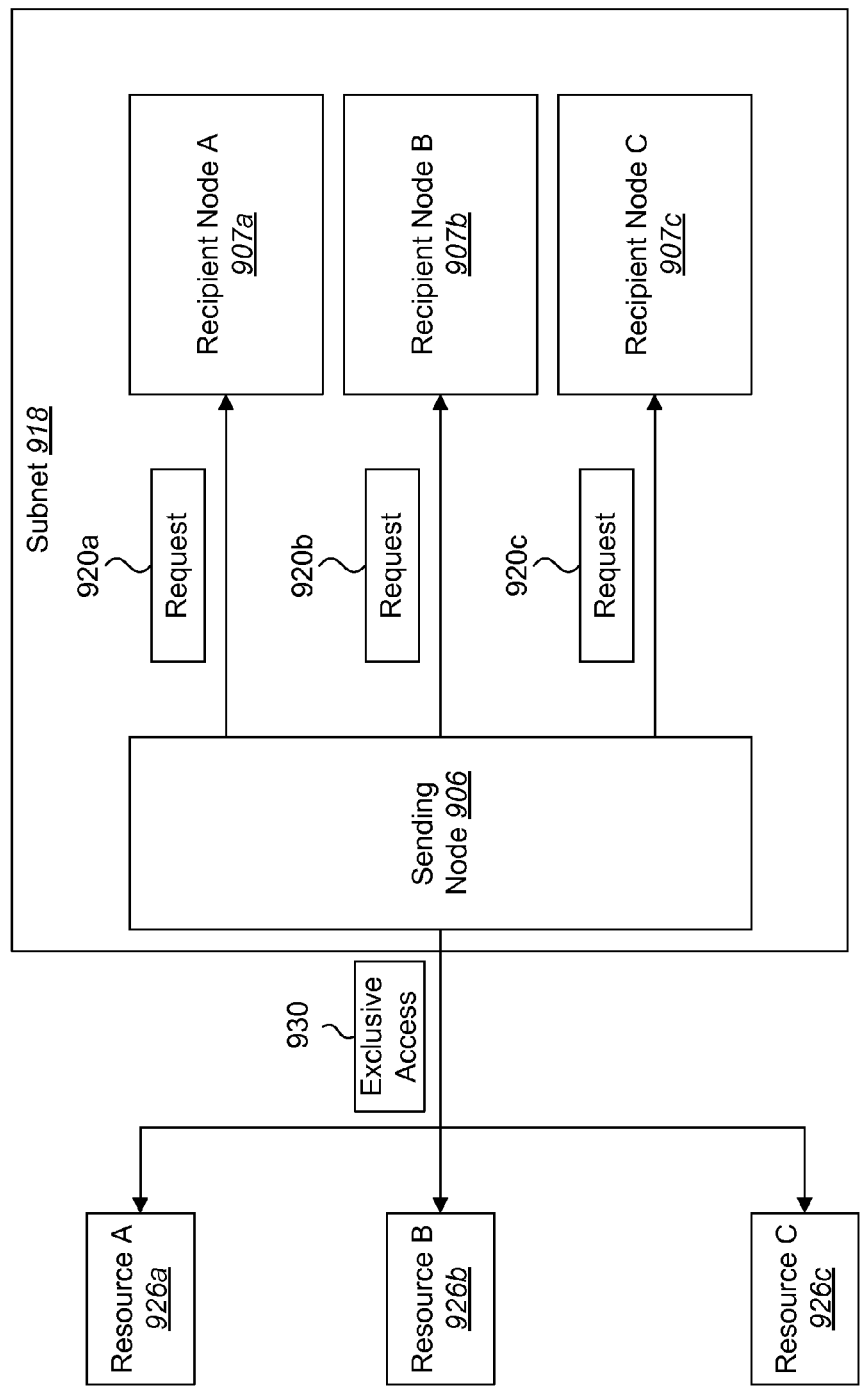
FIG. 9 is a block diagram illustrating one embodiment of a system wherein a sending node obtains exclusive access to multiple resources.

FIG. 9 illustrates how, in one embodiment, the recipient nodes 907 in a subnet 918 may respond to a sending node 906 sending the discovery request 920. In FIG. 9, neither recipient node A 907a, recipient node B 907b, or recipient node C 907c are accessing resource A 926a, resource B 926b, or resource C 926c. Consequently, none of the recipient nodes 907a, 907b, 907c reply to the discovery request 920. Because no reply 728 has been sent by any of the recipient nodes 907a, 907b, 907c, the sending node 906 obtains exclusive access 930 to each of the resources 926a, 926b, 926c. As noted above, in one embodiment, the request 920 may be sent N times to each of the recipient nodes 907a, 907b, 907c before exclusive access 930 may be obtained.

In the embodiment illustrated in FIG. 9, a recipient node 907 replies only if it is accessing the specified resource 926. As indicated above, various other techniques, such as sending a reply 728 including data indicating whether the recipient node 907 is accessing the resource(s) 926, may be used.

Figure 10:
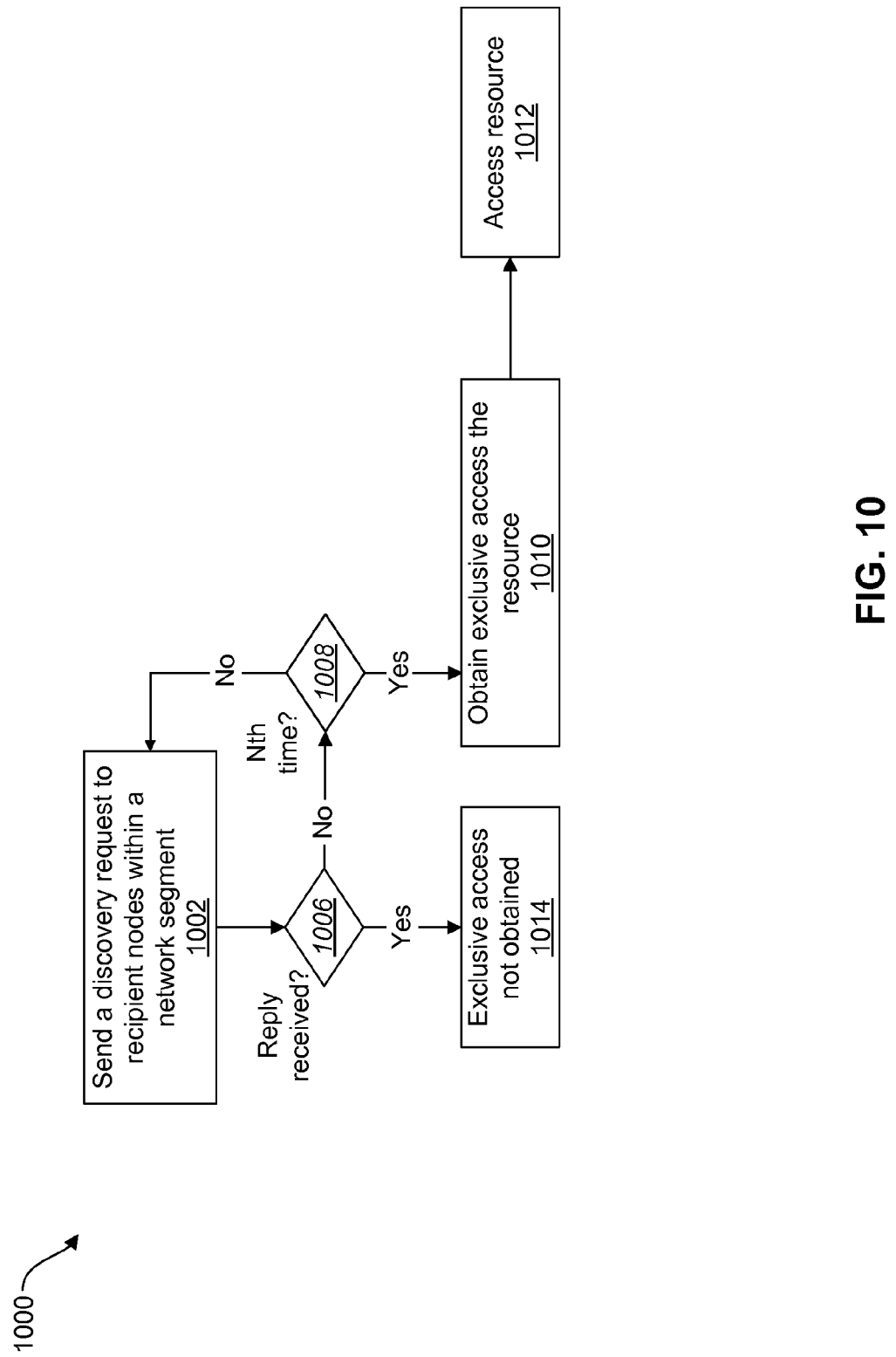
FIG. 10 is a flow diagram illustrating one embodiment of one method for obtaining exclusive access to a computing resource utilizing a network.

FIG. 10 illustrates one embodiment of a method 1000 for obtaining exclusive access 730 to a computing resource 726. A discovery request 720 is sent 1002 to one or more recipient nodes 707 within a network segment. The network segment may comprise a subnet 718 within a network.

It is then determined 1006 whether a reply 728 has been received from any of the recipient nodes 707. If no reply 728 has been received, then it is optionally determined 1008 whether the discovery request 720 has been sent N times. As indicated above, N may be any positive integer. In an alternative embodiment, this step 1008 is not needed and the discovery request 720 is only sent 1002 once to recipient nodes 707.

If the discovery request 720 has not been sent 1002 N times, then the request is sent 1002 again. Once again, it is determined 1006 whether a reply 728 has been received and it is also determined 1008 whether the discovery request 720 has been sent N times. This process 1002, 1006, 1008 is repeated until a reply 728 has been received or the discovery request 720 has been sent N times and no reply 728 has been received. In one embodiment, a specified period of time must elapse between sending 1002 each of the discovery requests 720.

If the discovery request 720 has been sent N times and no reply 728 has been received, exclusive access 730 to the resource may be obtained 1010. Thereafter, the sending node 706 may access 1012 the resource 726, such as by accessing a server or file or by sending a print job to a printer. If a reply 728 has been received by the sending node 706, no exclusive access is obtained 1014. In one embodiment, a specified period of time must elapse after the Nth discovery request 720 is sent 1002 before it is determined whether exclusive access 730 to the resource 726 may or may not be obtained 1010, 1014. In another embodiment, as soon as Nth discovery request 720 is sent, it is determined whether exclusive access 730 to the resource may be obtained.

Figure 11:
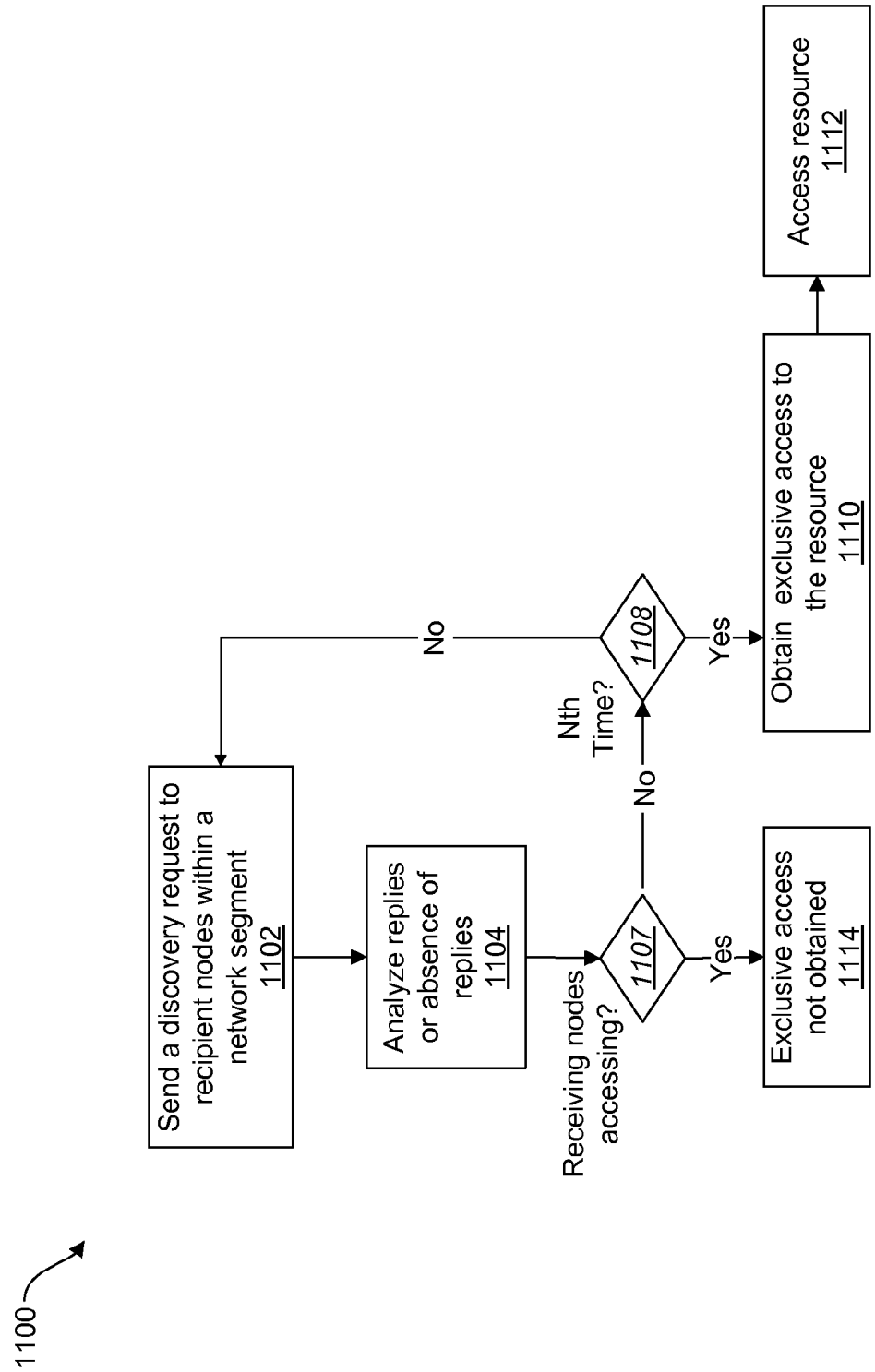
FIG. 11 is a flow diagram illustrating an alternative embodiment of one method for obtaining exclusive access to a computing resource, again, utilizing a network.

FIG. 11 illustrates another embodiment of a method 1100 for obtaining exclusive access 730 to a computing resource 726. In this embodiment, a discovery request 720 is sent 1102 to recipient nodes 707 within a network segment. Replies 728 or an absence of replies 728 from the recipient nodes 707 are analyzed 1104. As indicated above, the absence of replies 728, in one embodiment, may indicate that none of the recipient nodes 707 are accessing a specified resource 726. In an alternative embodiment, a reply 728 may indicate that a particular recipient node 707 is not accessing the specified network resource 726. In yet another embodiment, replies 728 are received from all of the recipient nodes 707, or at least all recipient nodes 707 that receive and successfully process the discovery request 720. Data within the replies 728 may indicate whether the pertinent recipient node 707 is accessing the specified resource.

Based on the analysis 1104 of the replies or absence of replies 728, it is determined 1107 whether the recipient nodes 707 are accessing the specified resource 726. If no recipient nodes 707 are accessing the specified resource 726, it is optionally determined 1108 whether the discovery request 720 has been sent to each recipient node 707 N times. If the request 720 has not been sent N times, the process of sending 1102 a request 720, analyzing 1104 the replies 528, determining 1107 whether the nodes 707 are accessing the specified resource 726, and determining 1108 whether the Nth request 720 has been sent is repeated.

If the Nth discovery request 720 has been sent 1102 and no reply 728 has been received, exclusive access 730 is obtained 1110 to the resource 726. Once again, after exclusive access 730 has been obtained, the sending node may access 1112 the resource 726. If a reply 728 has been received from one of the recipient nodes 707, then exclusive access 730 is not obtained 1114. Similar to the embodiment explained in connection with FIG. 10, a specified period of time may elapse after the Nth discovery request 720 is sent 1102 before it is determined whether exclusive access 730 may be obtained or this determination may be made immediately after the Nth discovery request 720 is sent.

The embodiments illustrated in FIGS. 10 and 11 are merely exemplary. For example, the order of the steps shown in these figures may be altered within the scope of the disclosed systems and methods. For example, with respect to the method shown in FIG. 11, it could first be determined 1108 whether the discovery request 720 has been sent N times before it is determined 1107 whether any of the recipient nodes 707 are accessing the resource 726.

Figure 12:
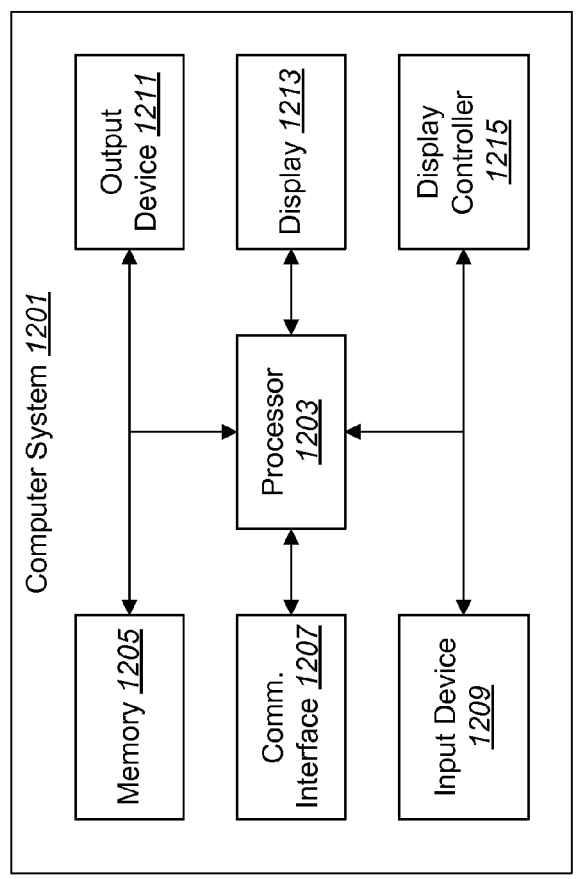
FIG. 12 is a block diagram illustrating the major hardware components typically utilized in a computer system.

FIG. 12 is a block diagram illustrating the major hardware components typically utilized in a computer system 1201. The illustrated components may be located within the same physical structure or in separate housings or structures.

The computer system 1201 includes a processor 1203 and memory 1205. The processor 1203 controls the operation of the computer system 1201 and may be embodied as a microprocessor, a microcontroller, a digital signal processor (DSP) or other device known in the art. The processor 1203 typically performs logical and arithmetic operations based on program instructions stored within the memory 1205.

As used herein, the term memory 1205 is broadly defined as any electronic component capable of storing electronic information, and may be embodied as read only memory (ROM), random access memory (RAM), magnetic disk storage media, optical storage media, flash memory devices in RAM, on-board memory included with the processor 1203, EPROM memory, EEPROM memory, registers, etc. The memory 1205 typically stores program instructions and other types of data. The program instructions may be executed by the processor 1203 to implement some or all of the methods disclosed herein.

The computer system 1201 typically also includes one or more communication interfaces 1207 for communicating with other electronic devices. The communication interfaces 1207 may be based on wired communication technology, wireless communication technology, or both. Examples of different types of communication interfaces 1207 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1201 typically also includes one or more input devices 1209 and one or more output devices 1211. Examples of different kinds of input devices 1209 include a keyboard, mouse, microphone, remote control device, button, joystick, trackball, touchpad, lightpen, etc. Examples of different kinds of output devices 1211 include a speaker, printer, etc. One specific type of output device which is typically included in a computer system is a display device 1213. Display devices 1213 used with embodiments disclosed herein may utilize any suitable image projection technology, such as a cathode ray tube (CRT), liquid crystal display (LCD), light-emitting diode (LED), gas plasma, electroluminescence, or the like. A display controller 1215 may also be provided, for converting data stored in the memory 1205 into text, graphics, and/or moving images (as appropriate) shown on the display device 1213.

Of course, FIG. 12 illustrates only one possible configuration of a computer system 1201. Various other architectures and components may be utilized.

The network segment that has been utilized in the embodiments described above has been a subnet. However, embodiments are not limited in this regard. For example, in some alternative embodiments, the methods disclosed herein may be practiced by the computer systems within a multicast alias domain. A multicast alias domain consists of all computers that can see each other's multicast traffic without crossing a router.

Various communication technologies may be used in embodiments disclosed herein. For example, multicast technology may be used to reach all machines with a multicast alias domain. Additional details about multicast domains are disclosed in U.S. Pat. No. 7,193,974, titled "Method and Apparatus for Dynamically Discovering Alias Domains," with inventors David A. Eatough and Gregory P. Olsen. Additional details about how multicast technology may be used to download files from within the same subnet are disclosed in U.S. Published Patent Application No. 2003/0187931, titled "Facilitating Resource Access Using Prioritized Multicast Responses to a Discovery Request," with inventors Gregory P. Olsen and David A. Eatough, and U.S. Pat. No. 6,928,051, titled "Application Based Bandwidth Limiting Proxies," with inventors Alan B. Butt, David A. Eatough, and Tony N. Sarra. The foregoing patent application and patents are hereby incorporated in their entirety into this application. Other communication technologies, such as broadcasts, may also be used. The discovery request could also be sent to all machines in the network using a point to point protocol.

Embodiments disclosed herein have been described in terms of managed nodes on a computer network. However, embodiments are not limited in this regard. In fact, embodiments may be practiced in any computer network that comprises a plurality of interconnected computer systems.

As used herein, the terms "sending node" and "recipient node," in both singular and plural forms, refer to a common node within the network, rather than a server, which ordinarily provides shared resources to other computer systems within a network. Thus, the systems and methods disclosed in this application provide a significant advantage over prior implementations in that a server does not need to perform the task of managing exclusive access to a computing resource. Instead, this task may be managed by the common nodes. This diminishes the burden placed on the server within the network and allows for distributed, rather than centralized, processing of exclusive access to computing resources.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for obtaining exclusive access to one or more computing resources using a network, the method comprising:
    sending a discovery request from a sending node within a network segment to one or more recipient nodes within the network segment, wherein the discovery request is configured to determine whether each recipient node is accessing at least one specified computing resource;
    analyzing one or more replies or an absence of a reply in response to the discovery request to determine whether any one of the recipient nodes is accessing the specified computing resource(s), wherein the absence of a reply indicates that the recipient nodes are not accessing the specified computing resource, wherein the only replies that are received are from the recipient nodes that are accessing the at least one specified computing resource;
    repeating, N times, the sending of the discovery request, wherein N is greater than one; and
    obtaining exclusive access to the specified computing resource(s) by the sending node, after waiting a specified period of time after an Nth discovery request, if there is an absence of a reply after the Nth discovery request, and wherein exclusive access is not granted if the sending node receives one or more replies from the recipient nodes.

2. The method of claim 1, further comprising sending multiple discovery requests to each recipient node before obtaining exclusive access to the specified computing resource(s).

3. The method of claim 1, wherein the discovery request is configured to request a reply indicating if each recipient node is accessing at least one of two or more specified computing resources.

4. The method of claim 1, further comprising accessing the computing resource(s).

5. The method of claim 1, wherein the network segment is a subnet.

6. The method of claim 1, wherein exclusive access to the specified computing resource(s) is maintained by the sending node transmitting a reply in response to receipt of a request from another node within the network segment to indicate that the sending node has exclusive access to the specified computing resource(s).

7. A node on a network that is configured to obtain exclusive access to one or more computing resources using a network, the node comprising:
    a processor;
    memory in electronic communication with the processor; and
    instructions stored in the memory, the instructions being executable to:
        send a discovery request to one or more recipient nodes within a network segment, wherein the discovery request is configured to determine whether each recipient node is accessing at least one specified computing resource;
        analyze one or more replies or an absence of a reply in response to the discovery request to determine whether any one of the recipient nodes is accessing the specified computing resource(s), wherein the absence of a reply indicates that the recipient nodes are not accessing the specified computing resource, wherein the only replies that are received are from the recipient nodes that are accessing the at least one specified computing resource;
        repeat, N times, the sending of the discovery request, wherein N is greater than one; and
        obtain exclusive access to the specified computing resource(s) by a sending node, after waiting a specified period of time after an Nth discovery request, if there is an absence of a reply after the Nth discovery request, and wherein exclusive access is not granted if the sending node receives one or more replies from the recipient nodes.

8. The node of claim 7, wherein the instructions are further executable to send multiple discovery requests to each recipient node before obtaining exclusive access to the specified computing resource(s).

9. The node of claim 7, wherein the discovery request is configured to request a reply indicating if each recipient node is accessing at least one of two or more specified computing resources.

10. The node of claim 7, wherein the instructions are further executable to access the computing resource(s).

11. The node of claim 7, wherein the network segment is a subnet.

12. The node of claim 7, wherein the instructions are further executable to maintain exclusive access to the specified computing resource(s) by the sending node transmitting a reply in response to receipt of a request from another node within the network segment to indicate that the sending node has exclusive access to the specified computing resource(s).

13. A non-transitory computer-readable medium comprising executable instructions for obtaining exclusive access to one or more computing resources using a network, the instructions being executable to:
    send a discovery request to one or more recipient nodes within a network segment, wherein the discovery request is configured to determine whether each recipient node is accessing at least one specified computing resource;
    analyze one or more replies or an absence of a reply in response to the discovery request to determine whether any one of the recipient nodes is accessing the specified computing resource(s), wherein the absence of a reply indicates that the recipient nodes are not accessing the specified computing resource, wherein the only replies that are received are from the recipient nodes that are accessing the at least one specified computing resource;
    repeat, N times, the sending of the discovery request, wherein N is greater than one; and
    obtain exclusive access to the specified computing resource(s) by a sending node, after waiting a specified period of time after an Nth discovery request, if there is an absence of a reply after the Nth discovery request, and wherein exclusive access is not granted if the sending node receives one or more replies from the recipient nodes.

14. The non-transitory computer-readable medium of claim 13, wherein the instructions are further executable to send multiple discovery requests to each recipient node before obtaining exclusive access to the specified computing resource(s).

15. The non-transitory computer-readable medium of claim 13, wherein the discovery request is configured to request a reply indicating if each recipient node is accessing at least one of two or more specified computing resources.

16. The non-transitory computer-readable medium of claim 13, wherein the instructions are further executable to access the computing resource(s).

17. The non-transitory computer-readable medium of claim 13, wherein the instructions are further executable to maintain exclusive access to the specified computing resource(s) by the sending node transmitting a reply in response to receipt of a request from a another node within the network segment to indicate that the sending node has exclusive access to the specified computing resource(s).

18. The method of claim 1, wherein the discovery request is sent using a point to multipoint protocol.

19. The method of claim 1, wherein the discovery request is sent using a point to point connectionless protocol.

20. The method of claim 1, wherein the discovery request is sent using a point to point connection-based protocol.

21. The method of claim 1, further comprising repeating the sending of the same discovery request from a sending node within a network segment to one or more recipient nodes within the network segment and repeating the analyzing of the one or more replies or an absence of a reply in response to the discovery request, wherein the sending and analyzing are performed N times, wherein N is greater than 1.

* * * * *

UNITED STATES PATENT AND TRADEMARK OFFICE
CERTIFICATE OF CORRECTION

PATENT NO. : 8,533,332 B1  
APPLICATION NO. : 11/764467  
DATED : September 10, 2013  
INVENTOR(S) : David A. Eatough Page 1 of 1

It is certified that error appears in the above-identified patent and that said Letters Patent is hereby corrected as shown below:

In the Specification:
In column 4, line 47 please delete "subnet 1226" and replace it with --subnet I 226--.

Signed and Sealed this
Fourteenth Day of January, 2014

Michelle K. Lee
*Deputy Director of the United States Patent and Trademark Office*